United States Patent [19]

Swindells et al.

[11] 3,848,126

[45] Nov. 12, 1974

[54] RECORDING OF KOSSEL LINES

[75] Inventors: Norman Swindells, Wallasey; Michael Bevis, Wirral, both of England

[73] Assignee: National Research Development Corporation, London, England

[22] Filed: June 20, 1973

[21] Appl. No.: 371,724

[30] Foreign Application Priority Data
July 7, 1972 Great Britain.................... 31961/72

[52] U.S. Cl.................. 250/272, 250/275, 250/306, 250/310
[51] Int. Cl............................................ H01j 37/26
[58] Field of Search .......... 250/310, 311, 307, 272, 250/273, 274, 275, 399, 309

[56] References Cited
OTHER PUBLICATIONS
"A Novel Form of X Ray Diffraction Microbeam Camera," Oron et al., Journal of Scientific Instr., Vol. 42, No. 5, May, '65, pp. 337–338.

"Design Consideration For a Kossel Microdiffraction Camera," Vuth et al., Journal of Scientific Instr., Vol. 37, No. 2, Feb. '66, pp. 206–209.

"Measurement of Microgram Surface Densiters by Observation of Proton Produced X Rays," Christensen, Rev. of Sci. Instr., Vol. 38, No. 1, pp. 20–23.

*Primary Examiner*—James W. Lawrence
*Assistant Examiner*—C. E. Church
*Attorney, Agent, or Firm*—Cushman, Darby & Cushman

[57] ABSTRACT

A camera for photographing Kossel lines caused by irradiating crystalline specimens with electron beams is disclosed. Previously such photographs were taken either by back reflection or transmission methods with the plane of the photographic plate perpendicular to the beam axis. This causes numerous disadvantages.

In the present embodiment the photographs are taken in a plane parallel to the electron beam, and technique for interpreting the photographs so taken is fully explained.

5 Claims, 3 Drawing Figures

RECORDING OF KOSSEL LINES

The present invention concerns the measurement of the physical characteristics of crystalline structures; for example it is frequently required to determine crystal lattice constants or crystal plane spacings to a high degree of precision and accuracy, to establish the symmetry of very small crystals for their identification, to establish the orientation of very small crystals and their relative orientation with other crystals in polycrystalline materials with high accuracy and precision, to measure the effect of the deformation of very small crystals, and to make studies of crystal perfection.

For some time it has been known that such measurements can be made, with very great accuracy, by use of x-ray photographic techniques involving what are known as Kossel lines. These techniques involve exciting the crystal specimen under measurement with divergent x-rays from an effective point source. The x-rays are diffracted by the specimen to form numerous diffraction and absorption cones that can be recorded on photographic film. The cones, which are generated from a source lying within the surface of the specimen, or within a thin layer of material lying on or near the surface, are Kossel lines.

A single pattern of these Kossel lines contains complete information about orientation, lattice constants, plane spacings, crystal type and symmetry.

The constraints on the design of Kossel cameras in the past have been due to the methods of interpretation available. These methods have required a prior knowledge of the distance between the specimen being examined and the film, and of the pattern centre. The pattern caused by Kossel lines on a flat film is a gnomonic projection of circles which lie on the surface of a sphere. The source is the centre of the sphere and the centre of the pattern is therefore the projection of this point on to the film. Previously the position of the centre has been defined by centring the film on the electron beam. Such photographic records can be taken using either transmission or back reflection methods. Thus in previous proposals, involving for example, the back reflection method, the photographic film is placed with its perpendicular axis coincidental with the axis of the beam electron which excites the x-rays and substantially parallel to the surface of the specimen.

This arrangement has a number of disadvantages. In particular it is difficult to obtain adequate contrast on the resultant photograph because of unwanted back scattered electrons, and the proximity of the film to the intense electron beam.

Furthermore the photographic plate has to be in a vacuum, and to have a hole in its centre. Also to obtain sufficient distance between the specimen and the film a long working distance of the final electron lens is needed.

In accordance with one aspect of the present invention there is provided a method of recording Kossel lines, comprising irradiating a crystalline specimen with a beam of fundamental particles so as to generate divergent x-rays from a point source within the specimen which fulfil the Bragg laws, and placing a recording medium parallel to the beam of fundamental particles.

In accordance with another aspect of the present invention there is provided apparatus for recording Kossel lines produced by irradiating a crystalline specimen with fundamental particles, comprising, and having means whereby it can be mounted relative to a source of fundamental particles and a specimen to be analysed so that a visible record of the Kossel lines so produced can be made parallel to said beam.

An embodiment of the present invention will now be described by way of example and with reference to the accompanying drawings, in which:

FIG. 1 shows a scanning electron microscope having its electron optical column generally indicated at 1, a specimen chamber 2, and specimen stage controls at 3. These controls are, of course, entirely conventional and for example control the orientation and position of a specimen within the specimen chamber.

Figure 1:
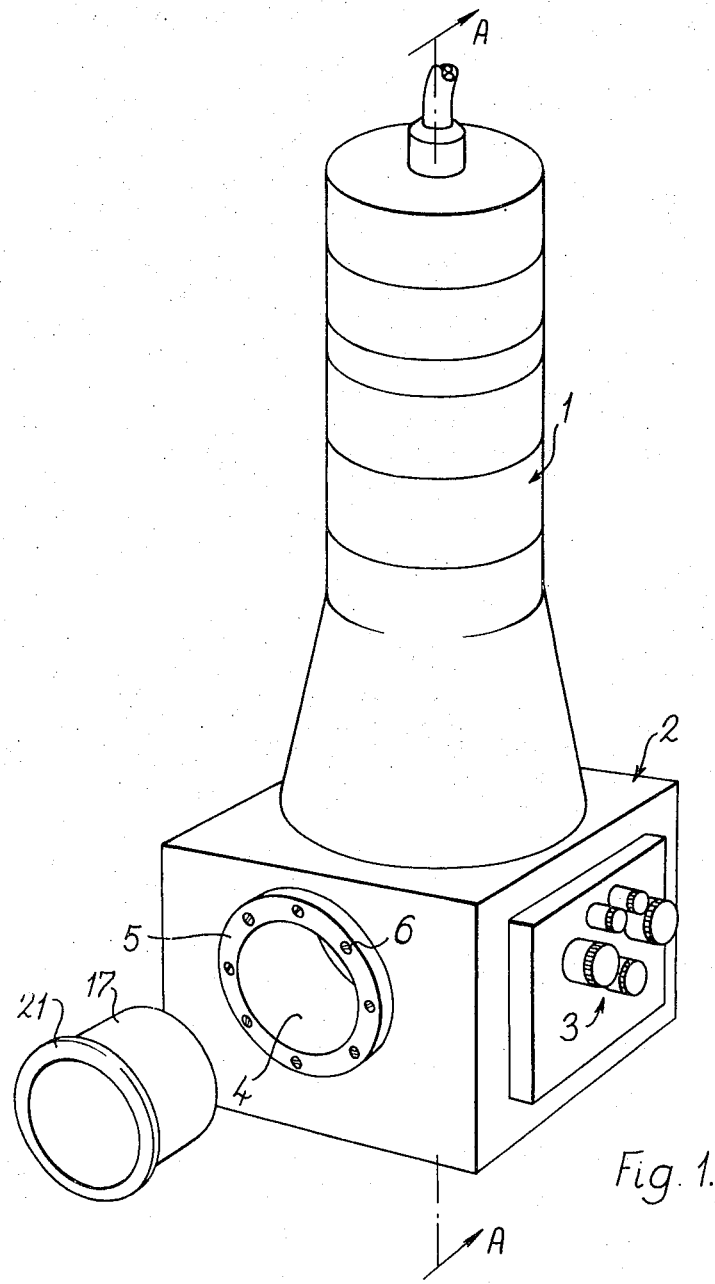
FIG. 1 is a perspective view of a scanning electron microscope and associated Kossel camera constructed in accordance with the present invention.

A main camera body 4 is flanged at 5 and bolted by bolts 6 to an aperture in the wall of the specimen chamber. The camera body 4 carries an x-ray window 7 made of "Mylar" or any other suitable polymeric material. Seals are provided at 8 and 9 to ensure that a high vacuum is maintained within the specimen chamber. These can best be seen in FIG. 2.

The electron microscope has an electron gun 10, an anode 11, lenses 12, 13, 14 and scanning coils 15 all conventional in construction. The specimen to be analysed is shown at 16.

The remainder of the camera consists of a cylindrical outer cassette 17 of aluminium carrying at one end a thin beryllium plate 18 which acts to prevent ambient light from exposing a photographic plate 19. The plate 19 is held in position by a cylindrical inner cassette 20 which is also of aluminium and which is a close sliding fit within the outer cassette 17. The inner cassette 20 is provided with a flange 21 so that it can easily be separated from the outer cassette when it is wished to develop the photographic plate 19. The flange 21 also acts as a light seal.

When in use the inner and outer cassettes are assembled together with a photographic plate in position and then inserted into the main camera body 4 so that the film 19 is held closely behind the x-ray window 7 and in a plane parallel to the electron beam.

When the specimen 16 is irradiated with the electron beam from the gun 10, the divergent x-rays are emitted from a point source within the specimen and as is well known, the pattern of those x-rays from the specimen which fulfil the Bragg law is uniquely determined by the crystal characteristics of the specimen.

Figure 3:
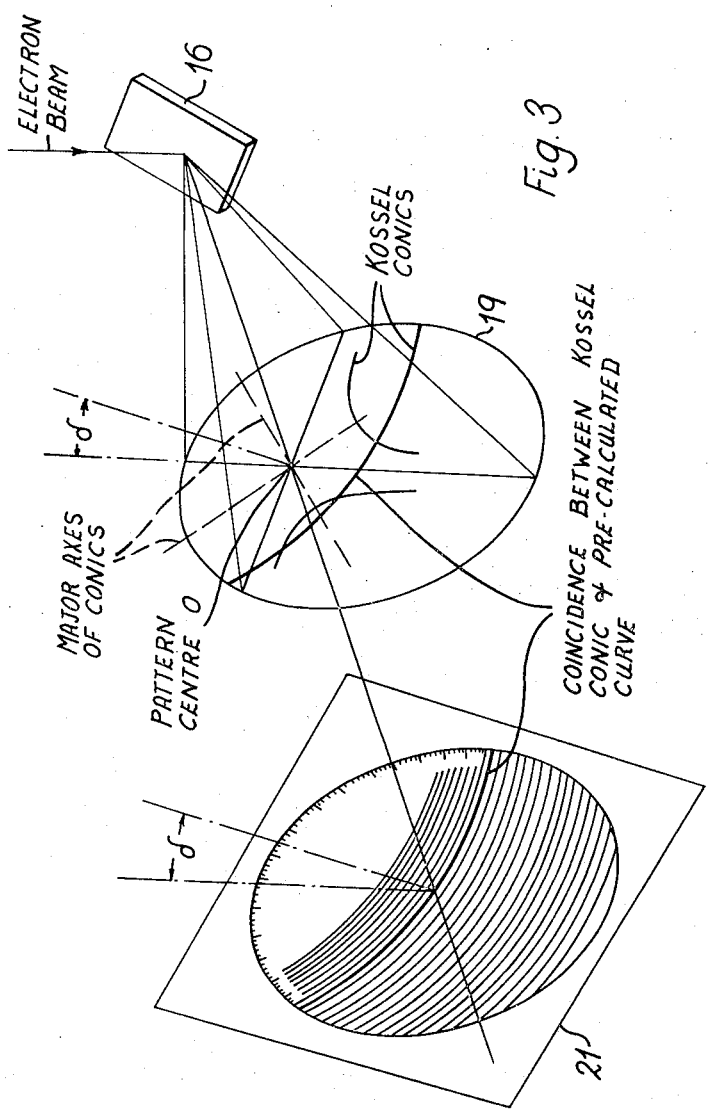
FIG. 3 is a diagrammatic perspective view showing how Kossel lines are generated and interpreted when photographed by a camera constructed in accordance with the present invention.
Figure 2:
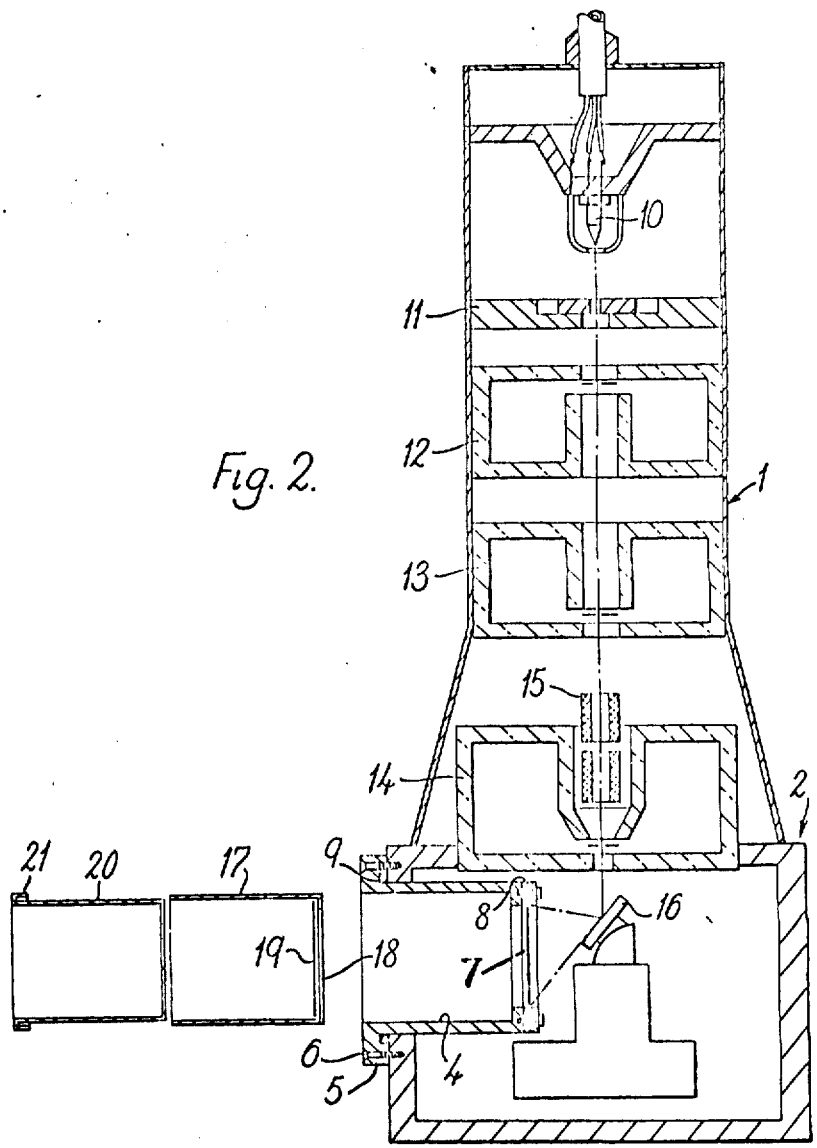
Figure 3:
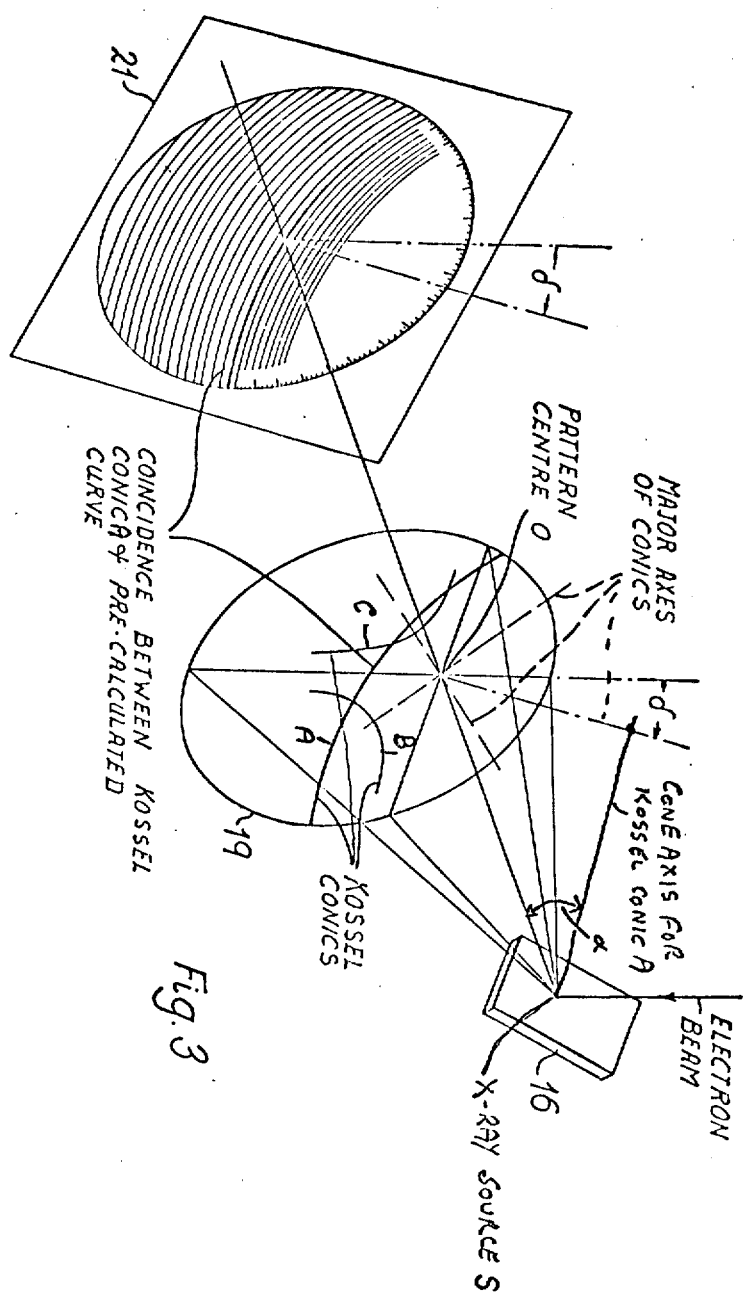

FIG. 3 shows the relationship between the Kossel lines (such as lines A, B and C) formed on a photographic plate 19 and the diffraction conics of the emergent x-rays from a specimen 16 fulfilling the Bragg reflection laws. For any given line, the cone axis is normal to the relevant diffracting plane in the crystal and is defined with respect to a reference basis in the film by the angular co-ordinates $\alpha$ and $\delta$, $\alpha$ being the angle between the cone axis and the line joining the x-ray source S to the pattern centre O (that is the normal from the film to the source) and $\delta$ being the angle between the respective orthogonal projections on the plane of the film of the cone axis and the axis of the electron beam. If the angle $\alpha$ were varied while keeping $\delta$ fixed, a series of line positions would be obtained. The appearance of the line would change and in the series of positions, would be as represented on the chart 21 shown in FIG. 3. This chart is for a cone with a semi-apex angle of 62° and a source to film distance of 4 cms. The source-to-film distance is the length of the normal from the film to the source. In use the chart is rotated about the pattern centre O until a line on the chart coincides with a line on the pattern. The co-ordinates $\alpha$ and $\delta$ are then read off directly. If the centre of the pattern needs to be established then, from the geometry of the projection, it must lie at the intersection of the major axes of the ellipses which the Kossel cones form on the film. When the chart is oriented correctly on a line therefore, the central axis of the chart will lie along the major axis of that ellipse. The cone angle of the line can also be used for indexing the corresponding plane if the crystal is known and with low symmetry crystals the extra information from the angular co-ordinates of the plane normal is invaluable for indexing purposes. The accuracy of orientation determination is not very sensitive to the cone angle and $\pm 1°$ can be tolerated in the fit. The fitting procedure is easiest between the range of Bragg angles from 25° to 60° and hence with charts constructed at 2° intervals the number of charts required for the orientation determination of all crystal types would be less than 20. In particular, since the source to film distance is fixed in this proposed design only one set of charts would be needed to index and orientate accurately all crystals. In practice the orientation of a known crystal can be established from the original pattern in approximately 5 minutes.

This proposed design of camera takes full advantage of the fact that the generation of a Kossel pattern is independent of the electron beam direction and utilises the capability of modern interpretation procedures to deal with patterns where the centre and the source-to-film distance are not known in advance. The position of the film, off the electron beam axis, should not interfere with other uses of the system and the camera could therefore be a permanent attachment to an electron probe micro-analyser or scanning electron microscope. The design could serve equally well as the basis of a relatively low cost instrument which would be used primarily for the generation of back-reflection and transmission Kossel patterns.

The arrangement described with reference to the accompanying drawings has the advantage that if the specimen tilt were to be varied, the distance between specimen and film (defined as the length of a normal from the film to the x-ray source) would not change. The proposed arrangement will not prevent the use of high accuracy methods of interpreting the pattern. Analytical methods as described are now available which do not require the pattern centre to be known and are therefore suitable for this arrangement. It is particularly important to note that the quickest method of interpretation is to use pre-calculated charts and fit them to the lines on the pattern. With the proposed arrangement only one set of charts would be necessary and would apply to all crystal patterns.

Furthermore, and a major advantage of the design described herein, the tilt capability would allow the same film position to be used for both back reflection and transmission — a situation which has never been achieved before. Furthermore, tilting of the specimen does not alter the distance between source and plate, a very important factor for rapid interpretation. Another point is that a low angle between a film normal and the specimen surface would increase the amount of the pattern, by comparision with a high or perpendicular angle, when the x-ray source is in a layer of material evaporated on to the surface — a procedure used when the x-rays from the specimen are not capable of forming a pattern and the x-rays from the layer are used instead. The tilt capability would allow this low angle to be controlled. Another advantage is that the design of the x-ray window 7 to avoid x-rays from the window from fogging the recording film should make the Kossel line contrast in back reflection equivalent to that obtained previously in the transmission arrangement and to allow a more logical control over the exposure conditions in the back reflection arrangement. The off-axis position of the film also assists the contrast because the most intense portion of the scattered exciting beam lies close to the incident beam when this is electrons. Finally it is not necessary to have a hole in the film to allow the exciting beam through in the back reflection position and if suitable means could be developed (e.g., channel plates, other image intensifiers or viewing screen of sufficient sensitivity), the film could be replaced by a system for viewing the pattern directly without having to process a film.

Although the present embodiment has been described with reference to a scanning electron microscope the camera could in fact be fitted to any instrument having a capability of generating a divergent beam of x-rays. The camera could therefore be an attachment to transmission electron microscopes, scanning transmission electron microscopes, scanning electron microscopes, x-ray microscopes, as examples, without interfering with their use for other purposes; particularly if their main use involved events in the direction of the exciting beam.

Any crystalline material can be examined by this technique and hence it could be applied to the identification of minerals in fine polycrystalline mixtures or individual mineral particles and for studying crystalline polymers in ways analogous to those used for metals. Throughout the specification the word "camera" is intended to cover any device by means of which a pictorial record can be taken of the Kossel lines.

We claim:

1. Apparatus for recording Kossel lines produced by irradiating a crystalline specimen with a beam of fundamental particles comprising mounting means for mounting the specimen in the path of the beam of fundamental particles so as to generate divergent X-rays from a point source within the specimen which fulfill the Bragg laws, a planar recording medium, means for mounting said planar recording medium parallel to the beam of fundamental particles and spaced from the specimen whereby the divergent X-rays form Kossel lines on said planar recording medium.

2. Apparatus for use in combination with an electron microscope for recording Kossel lines produced by irradiating a crystalline specimen with a beam of electrons comprising mounting means for mounting the specimen in the specimen chamber of the electron microscope in the path of the beam of electrons generated by the microscope so as to generate divergent X-rays from a point source within the specimen which fulfill the Bragg laws, a planar recording medium, means for mounting said planar recording medium in spaced proximate relation to the specimen, with said planar recording medium being parallel to the beam of electrons whereby the divergent X-rays form Kossel lines on said planar recording medium.

3. Apparatus in accordance with claim 2 wherein said means for mounting said planar recording medium includes a first cylindrical member mounted in a wall of the microscope specimen chamber and extending thereinto, said first cylindrical member being sealed at its end within the chamber by a sheet of material transparent to X-rays and being open at its end outside the specimen chamber, and further including a second cylindrical member for insertion into said first cylindrical member, said second cylindrical member carrying said planar recording medium adjacent its end which is first inserted into said first cylindrical member.

4. Apparatus in accordance with claim 3 wherein said first inserted end of said second cylindrical member is covered with a material transparent to X-rays and opaque to visible light rays, and including a third cylindrical member for insertion into said second cylindrical member, said third cylindrical member functioning to hold said planar recording medium adjacent said material covering said first inserted end of said second cylindrical member.

5. Apparatus in accordance with claim 4 wherein said planar recording medium comprises a photographic plate.

* * * * *

UNITED STATES PATENT OFFICE
CERTIFICATE OF CORRECTION

Figure 2:
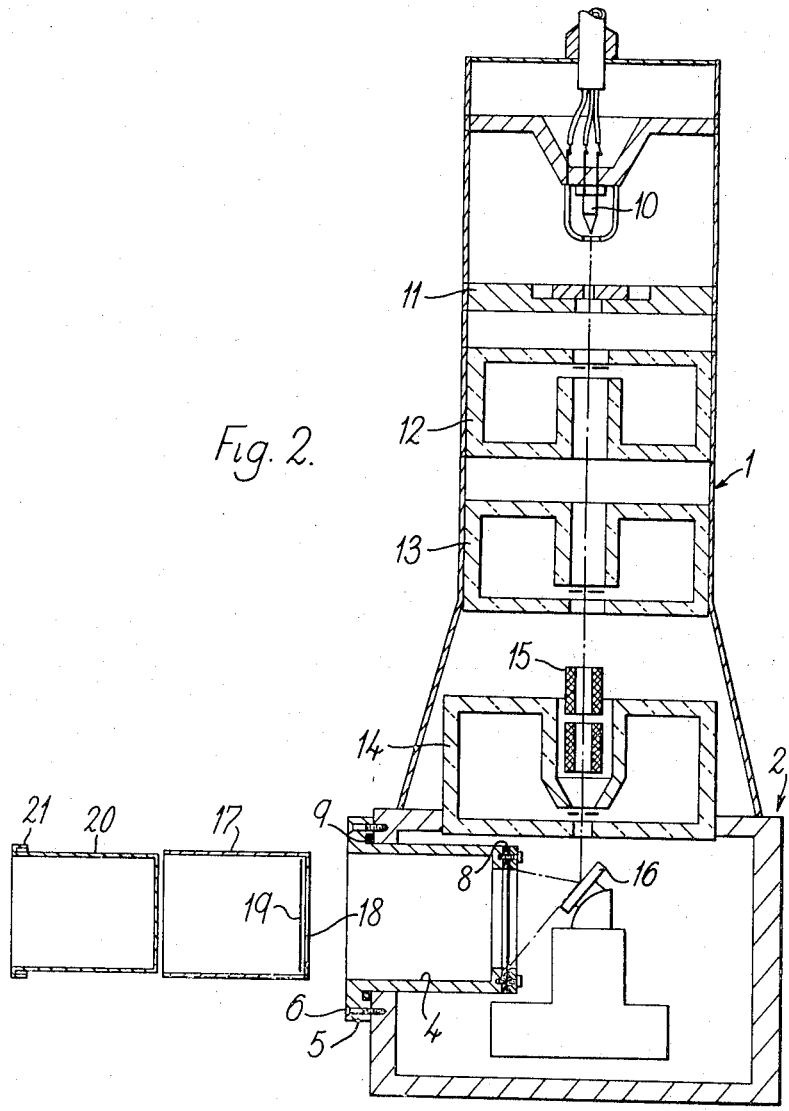
FIG. 2 is a section on line II—II of FIG. 1.

PATENT NO. : 3,848,126
DATED : November 12, 1974
INVENTOR(S) : Norman SWINDELLS, et al It is certified that error appears in the above-identified patent and that said Letters Patent are hereby corrected as shown below:

Figures 2 and 3 of the drawings should appear as on the attached copies thereof.

Signed and Sealed this

Sixth Day of July 1976

[SEAL]

Attest:

RUTH C. MASON
*Attesting Officer*

C. MARSHALL DANN
*Commissioner of Patents and Trademarks*